(12) United States Patent
Zhang et al.

(10) Patent No.: US 7,142,851 B2
(45) Date of Patent: Nov. 28, 2006

(54) TECHNIQUE FOR SECURE WIRELESS LAN ACCESS

(75) Inventors: Junbiao Zhang, Bridgewater, NJ (US);
Saurabh Mathur, Plainsboro, NJ (US);
Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 649 days.

(21) Appl. No.: 10/424,442

(22) Filed: Apr. 28, 2003

(65) Prior Publication Data
US 2004/0214570 A1 Oct. 28, 2004

(51) Int. Cl.
*H04Q 7/20* (2006.01)
*H04K 1/00* (2006.01)
(52) U.S. Cl. .................. 455/426.2; 380/247
(58) Field of Classification Search .......... 455/410, 455/411, 426.2; 370/310; 380/270, 277, 380/247; 713/153, 166, 168
See application file for complete search history.

(56) References Cited

U.S. PATENT DOCUMENTS

| | | | |
|---|---|---|---|
| 6,351,536 B1 | 2/2002 | Sasaki | 380/44 |
| 6,453,159 B1 | 9/2002 | Lewis | 455/411 |
| 6,851,050 B1* | 2/2005 | Singhal et al. | 713/162 |
| 7,039,190 B1* | 5/2006 | Engwer et al. | 380/270 |
| 2002/0032855 A1* | 3/2002 | Neves et al. | 713/154 |
| 2003/0007464 A1* | 1/2003 | Balani | 370/310 |
| 2003/0219129 A1* | 11/2003 | Whelan et al. | 380/270 |
| 2004/0076300 A1* | 4/2004 | Ishidoshiro | 380/277 |

OTHER PUBLICATIONS

"*Towards Ubiquitous Wireless Broadband*", Boingo Wi-Fi Industry White Paper, published by Boingo Wireless. Mar. 10, 2003.
*Wi-Fi Security for the Enterprise*, John Sidline et al., published by iPAss, Inc. Aug. 12, 2002.

* cited by examiner

*Primary Examiner*—Benny Quoc Tieu
(74) *Attorney, Agent, or Firm*—Joseph J. Laks; Robert B. Levy

(57) ABSTRACT

An access arrangement (11) provides secure access by at least one mobile communications device ($12_1$–$12_3$) by first authenticating the device itself, and thereafter authenticating the traffic therefrom. To authenticate the traffic from the mobile communications device, an authentication server (24) associated with the access arrangement (11) establishes a Wired Equivalent Privacy (WEP) encryption key for both the access arrangement and the mobile communications device. The authentication server provides the WEP encryption key to the device in connection with a command to cause the device to execute a resident ActiveX control to encrypt traffic with the WEP encryption key. Utilizing the Active X control within the mobile communications device to encrypt traffic with the WEP encryption key provides a simple, easy-to-implement method to achieve secure access.

12 Claims, 2 Drawing Sheets

US 7,142,851 B2

TECHNIQUE FOR SECURE WIRELESS LAN ACCESS

TECHNICAL FIELD

This invention relates to a technique for enabling a mobile communication device to securely access a wireless Local Area Network (LAN).

BACKGROUND ART

Presently, providers of data communications services have established wireless Local Area Networks (LANs) ("hot spots") at publicly accessible facilities, such as rest stops, cafes, and libraries, to allow mobile communication devices to access a private data network or a public data network, such as the Internet, for a fee. Upon entering such a publicly accessible facility, the mobile communication device establishes a communication link, typically over a wireless channel, with an access point (AP) to access to the wireless LAN, and the public or private network therebeyond. Presently, for web browser based authentication, initial validation of the mobile communication device occurs through the use of the secure hypertext transfer protocol (HTTPS) executed by the browser software in the device. However, authentication of the mobile communication device is only one of several factors that affect overall security. Another factor affecting security is traffic authentication.

After successful authentication of the mobile communication device, the question remains how can the wireless LAN make sure that the traffic it receives originates from the authenticated mobile communication device and not an unauthorized sender. In practice, the mobile communication device originates IP packets (which can be further broken down to Ethernet frames) without any device identification or signature. Thus, from the perspective of the wireless LAN, incoming IP packets from an authorized sender look exactly the same as those from an unauthorized sender. Hence, the wireless LAN has no way to distinguish between traffic from an authorized mobile communication device and from a hacker who has managed to circumvent the initial authentication process.

Thus, there is need for a technique that enables a mobile communications device to securely access a wireless LAN so as to overcome the aforementioned disadvantage of the prior art.

BRIEF SUMMARY OF THE INVENTION

Briefly, in accordance with the present principles, there is provided a method for enabling a mobile communications device to securely access a wireless LAN. The method commences upon receipt in the wireless LAN of an access request from the mobile communications device. Thereafter, the wireless LAN authenticates the mobile communications device in accordance with authentication information received from the device. After authenticating the mobile communications device, the wireless LAN notifies the mobile communications device to invoke an executable program to enable a privacy key, typically a Wired Equivalent Privacy (WEP) encryption key. In practice, the executable program typically comprises an ActiveX program downloaded to the mobile communications device upon successful authentication. In addition to invoking the executable program in the mobile communications device to enable the WEP encryption key, the wireless LAN invokes the WEP for itself, thus enabling secure communications with the mobile communications device. Most present day browser software programs found in mobile communication device support ActiveX controls, so using such a feature to invoke the WEP encryption key affords a simple technique for authenticating mobile communication device traffic to assure secure wireless LAN access. In case ActiveX control is not supported by the browser on the mobile device, other techniques such as plug-ins can be employed.

DETAILED DESCRIPTION

Figure 1:
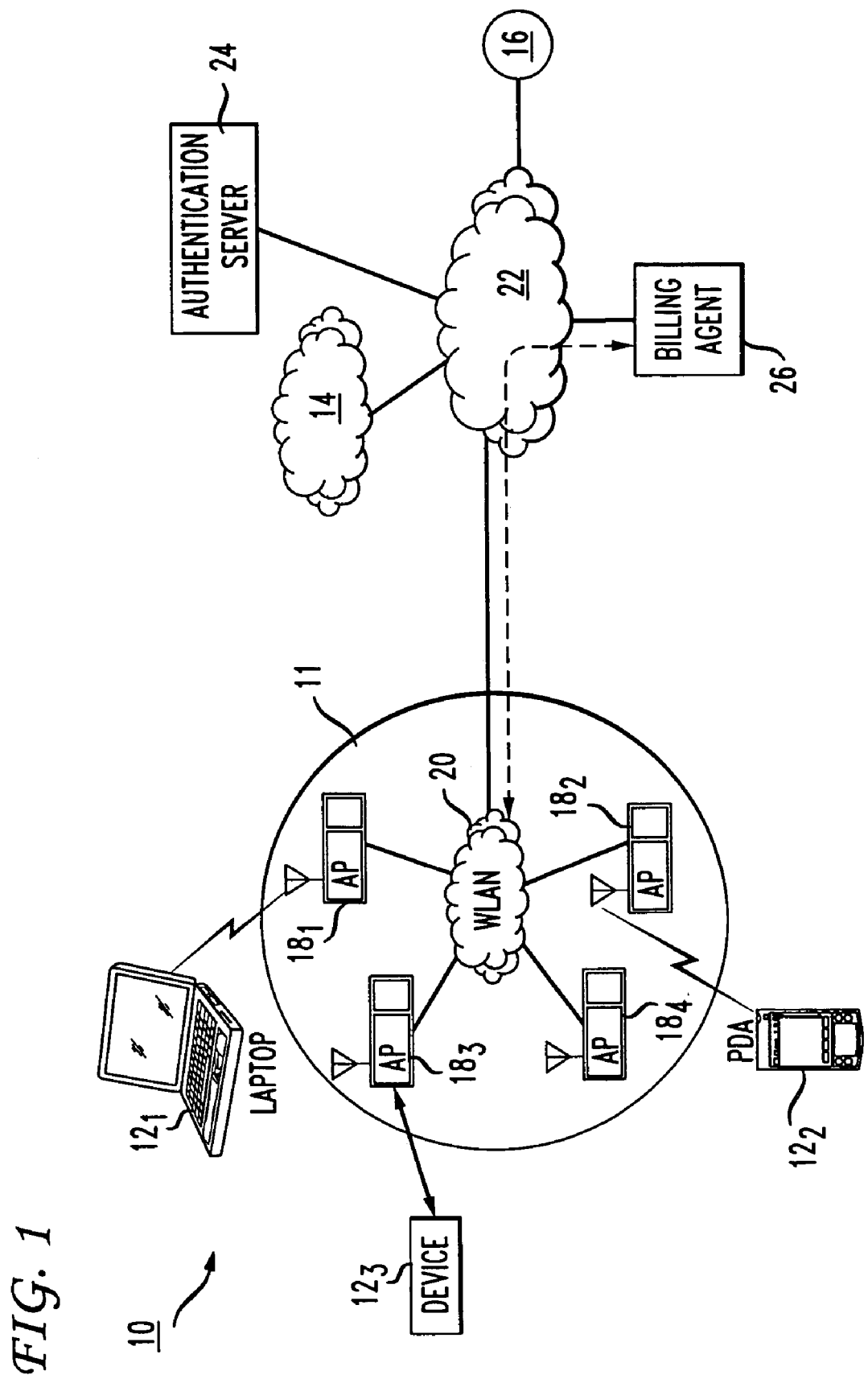
FIG. 1 illustrates a block schematic diagram of a wireless LAN for implementing the method of the present principles for establishing a business relationship with a Billing Agent.

FIG. 1 depicts a block schematic diagram of a communications network 10 that includes an access arrangement 11 for enabling at least one mobile communication device, and preferably a plurality of mobile communication devices (e.g., mobile communication devices $12_1$, $12_2$, and $12_3$) to securely access either a private data network 14 or a public data network 16, such as the Internet. In a preferred embodiment, the mobile communication device $12_1$, comprises a lap top computer, whereas the mobile communication device $12_2$ comprises a Personal Data Assistant, and the mobile communication device $12_3$ comprises a wireless handset.

The access arrangement 11 of FIG. 1 includes at least one, and preferably, a plurality of access points (APs), best exemplified by APs $18_1$–$18_4$, via which the mobile communication devices $12_1$, $12_2$ and $12_3$ each access a wireless Local Area Network (LAN) 20. Although shown separately, the APs $18_1$–$18_4$ comprise part of the wireless LAN 20. A gateway 22 provides a communication path between the wireless LAN 20 and the private and public networks 14 and 16, respectively. In the illustrated embodiment, each AP, such as AP $18_1$, includes a wireless transceiver (not shown) for exchanging radio frequency signals with a radio transceiver (not shown) within each mobile communication device. To this end, each of the APs $18_1$–$18_4$ employs one or more well-known wireless data exchange protocol, such as the "HiperLan 2" or IEEE 802.11 protocols. Indeed, different APs could employ different wireless protocols to accommodate different mobile communication devices.

The gateway 22 provides a link between the wireless LAN 20 and an authentication server 24. In practice, the authentication server 24 takes the form of a database system containing information about potential users to enable each of the APs $18_1$–$18_4$ to authenticate a mobile communications device seeking access. Rather than exist as a separate stand-alone entity, the authentication server 24 could exist within the wireless LAN 20. A billing agent 26 has a connection with the wireless LAN 20 through the gateway 22 to facilitate billing of each mobile communication device accessing the wireless LAN. As with the authentication server 24, the functionality of the billing agent 26 could exist within the wireless LAN 20.

In accordance with the present principles, there is provided a technique for enabling each mobile communication device, such as each of devices $12_1$–$12_3$, to securely access the wireless LAN 20 to afford authentication of both the device itself, as well as the traffic that emanates therefrom. The authentication technique of the present principles can best be understood by reference to FIG. 2, which depicts the sequence of communications that occurs over time among a mobile communication device, say device $12_1$, an AP, say AP $18_1$, and the authentication server 24. To initiate secure access, the mobile communications device $12_1$ transmits a request for access to the AP $18_1$ during step 100 of FIG. 2. In practice, the mobile communications device $12_1$ initiates the access request by way of a HTTPS access demand launched by a browser software program (not shown) executed by the device. In response to the access request, the AP $18_1$ redirects the browser software in the mobile communications device to a local welcome page on the AP during step 102.

Figure 2:
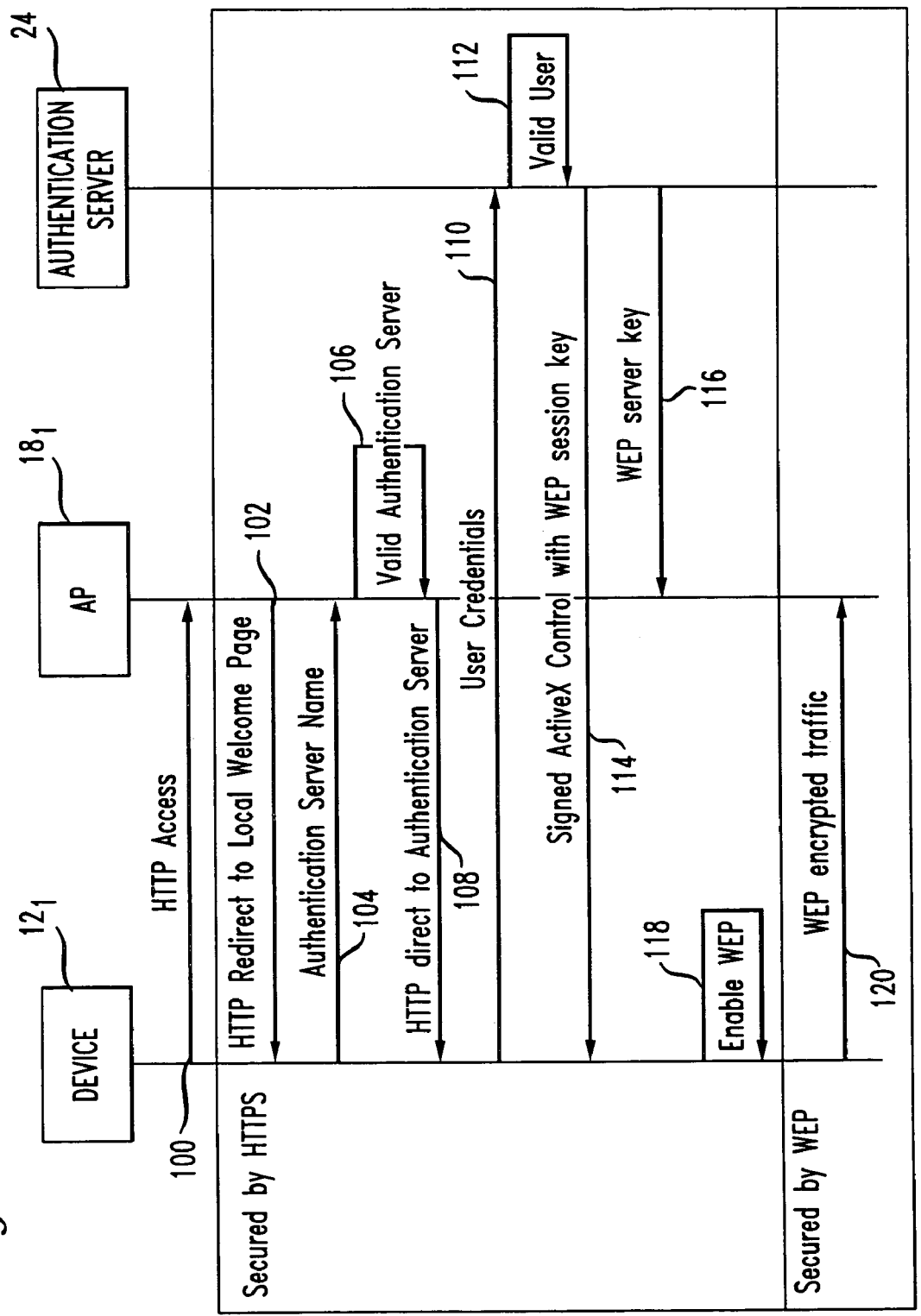
FIG. 2 illustrates a ladder diagram depicting the communications occurring between the wireless LAN and the mobile communications device over time to enable secure wireless LAN access.

Following step 102, the mobile communications device $12_1$, of FIG. 1 initiates authentication by querying the AP $18_1$, of FIG. 1 for the identity of the appropriate authentication server during step 104 of FIG. 2. In response, the AP $18_1$ determines the identity of appropriate authentication server (e.g., server 24) during step 106 of FIG. 2 and then directs the browser software in the mobile communications device $12_1$ to that server via an HTTP command during step 108 of FIG. 2. Having now received the identity of the authentication server 24 during step 108, the mobile communications device $12_1$ then sends its user credentials to the server during step 110 of FIG. 2.

Upon receipt of the user credentials from the mobile communications device $12_1$, the authentication server 24 makes a determination whether the mobile communications device constitutes a valid user during step 112. If so, then the authentication server 24 replies to the mobile communications device $12_1$ during step 114 with a Wired Equivalent Privacy (WEP) encryption key which the device invokes via an ActiveX command of an ActiveX control though the device browser software. Simply speaking, an ActiveX control is essentially an executable program that can be embedded inside a web page. Many software browser programs, such Microsoft Internet Explorer have the capability of displaying such web pages and invoking the embedded ActiveX controls, which can be downloaded from a remote server (e.g., the authentication server 24). The execution of the ActiveX controls are restricted by the security mechanisms built into the browser software. In practice, most browser programs have several different selectable security levels. At the lowest level, any ActiveX control from the web can be invoked without restriction. In the highest level, no ActiveX control can be invoked from the browser software.

Normally, the security level is set to medium, in which case only those ActiveX controls that have digital signatures can be invoked. For such ActiveX control, the browser software first checks the validity of the signature before invoking the ActiveX control to make sure that the following conditions exist: (1) the source of the ActiveX control can be traced, and (2), the ActiveX control has not been altered by anyone else other than the entity who signed it. In the illustrated embodiment, the authentication server 24 uses ActiveX control to deliver and set the WEP key on the mobile communications device $12_1$ after the device is authenticated. The ActiveX control is very simple and its only function is to set the key on the mobile communications device $12_1$ by providing the device a web page with the embedded ActiveX control, which is signed by the authentication server 24 following device authentication.

After providing the mobile communications device $12_1$ with the WEP session key during step 114, the authentication server 24 provides a corresponding WEP session key to the AP $18_1$ during step 116. Next, the mobile communications device $12_1$ enables WEP during step 118 of FIG. 2 and then commences the transmission of WEP-encrypted traffic to the AP $18_1$ during step 120 whereupon the AP will de-encrypt the data in accordance with its WEP session key.

The above-identified method for enabling secure wireless LAN access will work seamlessly for the majority of mobile communications devices since most devices employ browser software that support ActiveX controls, and the security level of the browser software in most devices is generally set to medium. For those mobile communications devices whose browser software is currently set with highest level of security, a request will be sent to the device to ask the user to temporarily alter the security setting for the web browser software to medium. For those mobile communication devices that do not employ browser software capable of supporting ActiveX controls, a browser software plug-in can be used. If the AP $18_1$ detects that the browser software in the mobile communications device $12_1$ seeking access does not support ActiveX control, the user of the mobile communications device $12_1$ will be prompted to download and install a small plug-in. The functionality of the plug-is essentially the same as the key-setting function of the ActiveX control. Once the plug-in is installed in the mobile communications device $12_1$, the authentication server 24 can set the WEP key on the mobile communications device by packaging the WEP key in a special file that invokes the plug-in. In turn, the plug-in reads the key WEP file and sets the key in the mobile communications device $12_1$.

For practical purposes, the WEP key setting ActiveX control should be parameterized. In other words, the ActiveX control should take the WEP key as a parameter. In this way, the authentication server 24 only needs to maintain a single compiled ActiveX control and use it for different sessions by supplying different parameters to requesting mobile communications devices. Otherwise, the authentication server 24 would have to build the WEP key inside the ActiveX control, i.e. build a different ActiveX control for each session, an inefficient process.

Under some circumstances, the parameterized approach could be prone to a security attack. Potentially a hacker knowing about the ActiveX control could compose a web page that invokes this ActiveX control with an arbitrary parameter. If the mobile communications device encounters such a web page, the WEP key on the device could be set incorrectly. No great harm will occur but such an attack could inconvenience the mobile communications device user because of the incorrectly set WEP key. A similar problem can exist when the mobile communications device $12_1$ does not support ActiveX control and must download an appropriate plug-in. A hacker could compose a web page with the special file type that invokes the WEP key-setting plug-in on the mobile communications device $12_1$. Again, no great harm will occur other than having the WEP key set incorrectly on the mobile communications device.

This type of security attack can be thwarted by the use of a server signature. In other words, the authentication server 24 not only signs the ActiveX control, but also signs the parameters. Further, to prevent a replay attack in which a hacker stores a previously used parameter to misconfigure the key on the user's device, the signed key will include an embedded time stamp. This process works in the following manner. The authentication request submitted by the mobile communications device $12_1$ to the authentication server 24 contains a script (e.g. a Javascript) that includes the local time kept by the device. The mobile communications device $12_1$ sends this information to the authentication server 24, typically as a hidden field in the HTML form on the page. In response, the authentication server 24 generates the encrypted WEP key, concatenates it with the local time of the mobile communications device $12_1$ and signs the result with the server's private key.

The authentication server 24 sends the signed string as the parameter to the ActiveX control to the mobile communications device $12_1$ (or in the case of plug-in, the file for the plug-in). The ActiveX control has the server's public key built-in. Upon execution at the mobile communications device $12_1$, the ActiveX control checks the parameter to make sure: (1) the parameter is indeed from the authentication server 24, and (2) the current local time and the local time in the parameter reasonably match to prevent a replay attack. The key is only set when the check passes.

For the plug-in, the signed string is placed in the file having the special extension for invoking the plug-in. Because multiple servers could employ the same plug-in, the plug in does not have a particular server's public key built in. Thus, in addition to the signed string mentioned above, the file also contains the certificate of the server. When the file is delivered to the mobile communications device $12_1$ and the plug-in is invoked, the plug-in examines the server's certificate in the file, obtains a valid server public key and verifies the signed string as described above.

The foregoing describes a technique for enabling secure access to a wireless LAN.

The invention claimed is:

1. A method for enabling a mobile communications device to securely access a wireless Local Area Network (LAN), comprising the steps of:
   receiving in the wireless LAN a request for access from the mobile communications device;
   authenticating the mobile communications device;
   establishing for the mobile communications device an encryption key for parameterizing a control element within the mobile communications device; and
   sending a command to the mobile communications devices that includes the encryption key, the command causing execution by the mobile communications device of the parameterized control element to set the encryption key within the device, which upon execution, configures the device with the encryption key so that communications traffic originated by the mobile communications device becomes encrypted with the encryption key.

2. The method according to claim 1 wherein the establishing step comprises the step of establishing a Wired Equivalent Privacy encryption key.

3. The method according to claim 2 wherein the parameterizing step comprises the step of using the Wired Equivalent Privacy encryption key as a parameter for the parameterized control element.

4. The method according to claim 3 further comprising the steps of signing the parameterized control element and signing the Wired Equivalent Privacy encryption key to indicate which server invoked the parameterized control element and originated the Wired Equivalent Privacy encryption key.

5. The method according to claim 4 wherein the step of signing the Wired Equivalent Privacy encryption key comprises the step of embedding within the key a time stamp containing a local time kept by the mobile communications device.

6. A method for enabling a mobile communications device to securely access a wireless LAN, comprising the steps of:
   receiving in the wireless LAN a request for access from a mobile communications device;
   authenticating the mobile communications device upon the receipt therefrom of user credentials;
   establishing for the mobile communications device a Wired Equivalent Privacy encryption key for parameterizing a control element within the mobile communications device;
   sending a command together with Wired Equivalent Privacy encryption key to the mobile communications device, the command causing the device to invoke the parameterized control element to configure the device with the Wired Equivalent Privacy encryption key so that communications traffic originated by the mobile communications device becomes encrypted.

7. The method according to claim 6 further comprising the steps of:
   signing the parameterized control element; and
   signing the Wired Equivalent Privacy encryption key to indicate which server invoked the-control element and originated the encryption key.

8. A wireless Local Area Network (LAN) for providing secure access to at least one mobile communications device, comprising:
   at least one access point for receiving an access request from a mobile communications device;
   an authenticating server for: (1) authenticating the mobile communications device, (2) establishing for the mobile communications device an encryption key for parameterizing an control element in the mobile communications device, and (3) sending a command that includes the encryption key, the command causing execution by the mobile communications device of the parameterized control element to set the encryption key so that communications traffic originated by the mobile communications device becomes encrypted with the encryption key; and
   a core network for linking the access point and the authenticating server.

9. The wireless LAN according to claim 8 wherein the encryption key comprises a Wired Equivalent Privacy key.

10. The wireless LAN according to claim 8 wherein the authentication server parameterizes the control element using a Wired Equivalent Privacy encryption key as a parameter.

11. The wireless LAN to claim 10 wherein the authentication server signs the control and signs the Wired Equivalent Privacy encryption key.

12. In a wireless Local Area Network (LAN) for providing secure access to at least one mobile communications device,
   at least one access point for: (1) receiving an access request from a mobile communications device; (2) authenticating the mobile communications device, (3) establishing for the mobile communications device an encryption key for parameterizing an control element in the mobile communications device (4) sending a command that includes the encryption key, the command causing the mobile communications device to execute the parameterized control element that sets the encryption key so that communications traffic originated by the mobile communications device becomes encrypted with the encryption key.

* * * * *